(No Model.)

A. J. BEATON.
FLOOR OR CEILING PLATE.

No. 546,461. Patented Sept. 17, 1895.

Witnesses
Inventor
Allan J. Beaton
By James Shepard
Atty.

UNITED STATES PATENT OFFICE.

ALLAN J. BEATON, OF SOUTHINGTON, CONNECTICUT, ASSIGNOR TO THE BEATON & BRADLEY COMPANY, OF SAME PLACE.

FLOOR OR CEILING PLATE.

SPECIFICATION forming part of Letters Patent No. 546,461, dated September 17, 1895.

Application filed October 1, 1894. Serial No. 524,592. (No model.)

*To all whom it may concern:*

Be it known that I, ALLAN J. BEATON, a citizen of the United States, residing at Southington, in the county of Hartford and State of Connecticut, have invented certain new and useful Improvements in Floor or Ceiling Plates, of which the following is a specification.

My invention relates to improvements in floor or ceiling plates or collars for pipes; and the objects of my improvement are simplicity and economy in construction and general convenience and utility of the article.

Figure 1:
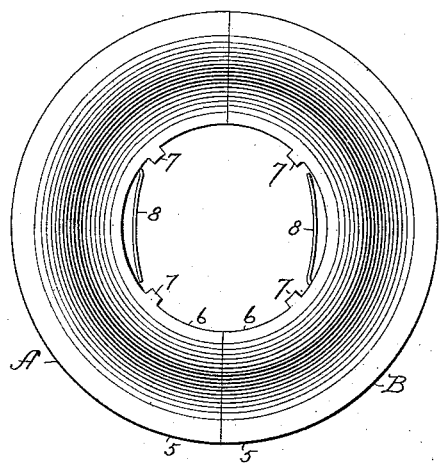
Figure 2:
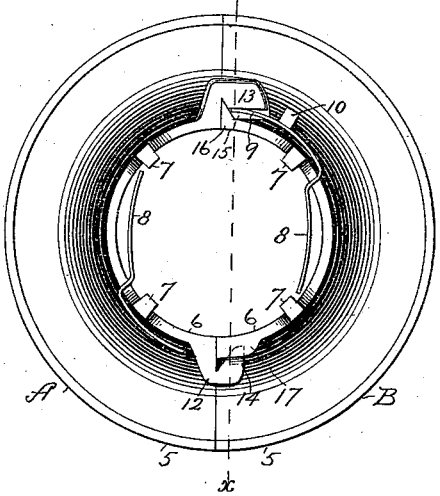
Figure 3:
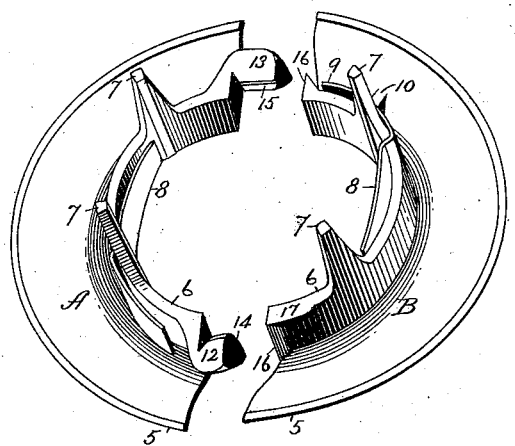
Figure 4:
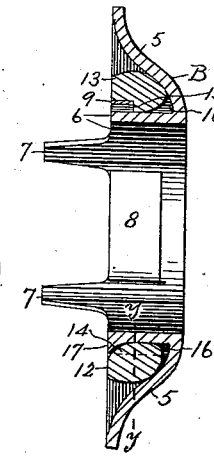
Figure 5:
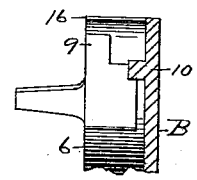
Figure 6:
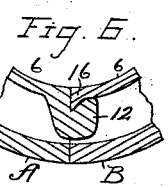

In the accompanying drawings, Figure 1 is a plan view of my plate or collar. Fig. 2 is a reverse plan view of the same. Fig. 3 is a perspective view of my plate or collar, showing the under side, the two parts being slightly separated from each other. Fig. 4 is a sectional view on the line x x of Fig. 2. Fig. 5 is a detached sectional view of a portion of one plate on a concentric curved line just outside of the spring-latch 9, and Fig. 6 is a sectional view of a portion of the same on the line y y of Fig. 4.

My plate has two principal parts A B, made preferably of cast metal and divided diametrically, as shown. The outer or finishing flange or rim 5 of these parts may be of any pleasing or ordinary design. The inner or collar flange 6 may be fitted to the pipe, but I prefer to make it on a curve a little larger than the pipe for which it is intended, and provide its inner surface with ribs 7, which may be made of greater length than the width of said flange, as shown in Figs. 3 and 4. These ribs are for engaging the circumference of the pipe to form a bearing to assist in centering the complete device and holding it in place. I also prefer to employ the spring-arms 8 to furnish additional bearings on the pipe and to insure sufficient friction to hold the complete device in position thereon. I secure said spring by forming or sawing slits in the collar-flanges 6, then forcing an offset portion of the flat sheet-metal spring edgewise into said slits and, if necessary, heading down the metal at the mouth of the slits to prevent the springs from working out of the slits.
The same piece of sheet metal that forms the spring-arm 8 on the part B is extended inside of the collar-flange and made narrow at its outer end to form a spring-latch 9, and it is limited in its outward movement by a suitable stop 10 on said part B.

The part A is provided with two hooked lugs 12 and 13. Both of these lugs are hooked in substantially a diametrical direction to form a recess between the inner face of each hook and the shank which connects it with said part A, while the lug 12 has a beveled or sloping face 14 to resist a movement of one part on the other in the longitudinal direction of the pipe. The lug 13 is provided with an abrupt shoulder 15 for the same purpose. The central hollow or recess between the flanges 5 and 6 on the part B will admit the body of the lugs 12 and 13, while the inner edge of the flange 6 in the longitudinal direction of the pipe is provided with a radially-projecting web 16 for engaging said hooked lugs and preventing the parts A B from moving diametrically away from each other. The end edge of the flange 6 on the part B at the point in front of the face 14 is made overhanging, as at 17, to prevent that side of the parts A B from moving in the longitudinal direction of the pipe, while the spring-latch 9 at the other side engages the shouldered lug 13 for the same purpose. After the parts A B are thus constructed they may be brought together from opposite sides of the pipe, and then tipping them slightly into different planes the lug 12 of the part A is placed in engagement with the web 16 and overhanging edge 17 of the part B. Then pressing them toward the pipe and swinging on the lug 12 as an axis to bring both parts into the same plane, the nose of the lug 13 will engage the spring-latch 9 to push it out of the way as the other radial web 16 is brought into engagement with the recess of said lug. As soon as the greatest projection of the lug 13 passes the spring-latch 9 said latch springs out over said shouldered lug 13 and secures that side of the parts together, whereby they are securely held against being separated by a movement either in a radial or longitudinal direction. The spring-arms 8 and ribs 7 now bear upon the pipe with sufficient friction to hold the plate or collar in the desired position on the pipe. In order to remove the plate or collar, the spring-catch 9 may be pushed from in front of the shouldered lug 13; then move the parts reversely to the movements described for putting them in place.

I claim as my invention—

1. A pipe thimble consisting of two sections joined at their abutting ends by hooked lugs and recesses with which the sections are respectively provided, one end of one of the sections having an overhanging edge or locking flange adapted to prevent disengagement of the hook and recess at that point and the opposite end of one of the sections having a retaining spring adapted to prevent accidental disengagement of the hook and recess thereat, substantially as described and for the purpose specified.

2. A pipe thimble comprising two sections adapted to be connected and disconnected for application to and removal from a pipe, and having an inner flange provided with slits, and the spring arms 8 secured within said slits and extended along inside of the inner face of said flange, substantially as described and for the purpose specified.

ALLAN J. BEATON.

Witnesses:
  A. W. STIPEK,
  JAMES SHEPARD.